United States Patent [19]

Kawamura

[11] Patent Number: 4,618,998
[45] Date of Patent: Oct. 21, 1986

[54] RADIO COMMUNICATIONS CONTROL SYSTEM WHICH AUTOMATICALLY RETURNS THE SYSTEM TO THE SPEECH CHANNEL

[75] Inventor: Katsuaki Kawamura, Kawagoe, Japan

[73] Assignee: Pioneer Electronic Corporation, Tokyo, Japan

[21] Appl. No.: 537,011

[22] Filed: Sep. 29, 1983

[30] Foreign Application Priority Data

Sep. 30, 1982 [JP] Japan .................. 57-171576

[51] Int. Cl.[4] .................. H04B 1/40; H04Q 7/00; H04M 11/00
[52] U.S. Cl. .................. 455/77; 455/34; 179/2 EB
[58] Field of Search .................. 455/54, 56, 77, 34, 455/33; 179/2 EB

[56] References Cited

U.S. PATENT DOCUMENTS

| | | | |
|---|---|---|---|
| 4,028,500 | 6/1977 | McClure et al. | 179/2 EB |
| 4,400,585 | 8/1983 | Kaman et al. | 179/2 EB |
| 4,409,687 | 10/1983 | Berh et al. | 455/54 |
| 4,430,755 | 2/1984 | Nadir et al. | 455/77 |
| 4,434,506 | 2/1984 | Fujiwara et al. | 455/56 |

Primary Examiner—Jin F. Ng
Assistant Examiner—Curtis Kuntz
Attorney, Agent, or Firm—Fleit, Jacobson, Cohn & Price

[57] ABSTRACT

A radio communications system having a call channel and a plurality of speech channel one of which is to be selected, is provided with means for returning to a last used speech channel in the event that a call is required within a predetermined time period after returning to the call channel which may take place during a call on a selected speech channel or when the call is completed. The system is further provided with means for automatically reset the system at the call channel predetermined time period after the completion of a call on a selected speech channel. With these means, the operation for going back to the last used speech channel is made easy. Further, the system is prevented from occupying the selected speech channel even if the reset switch is not operated after the call is completed.

2 Claims, 6 Drawing Figures

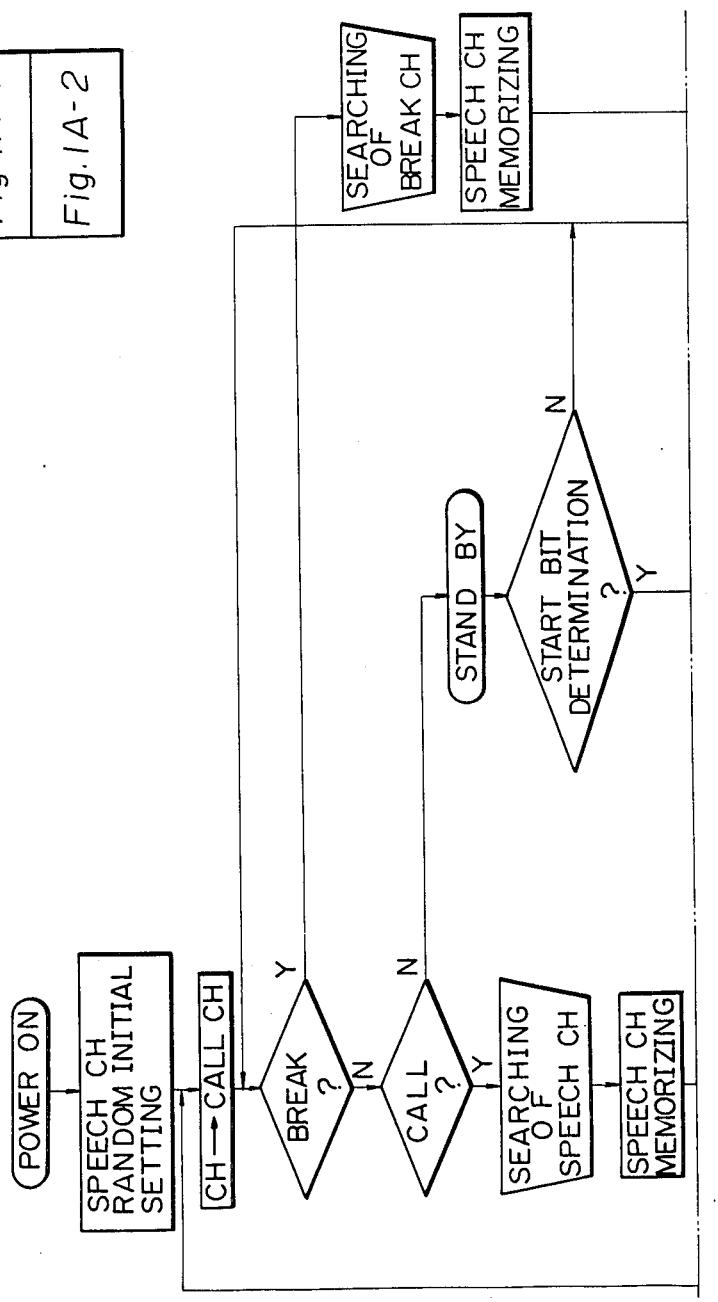

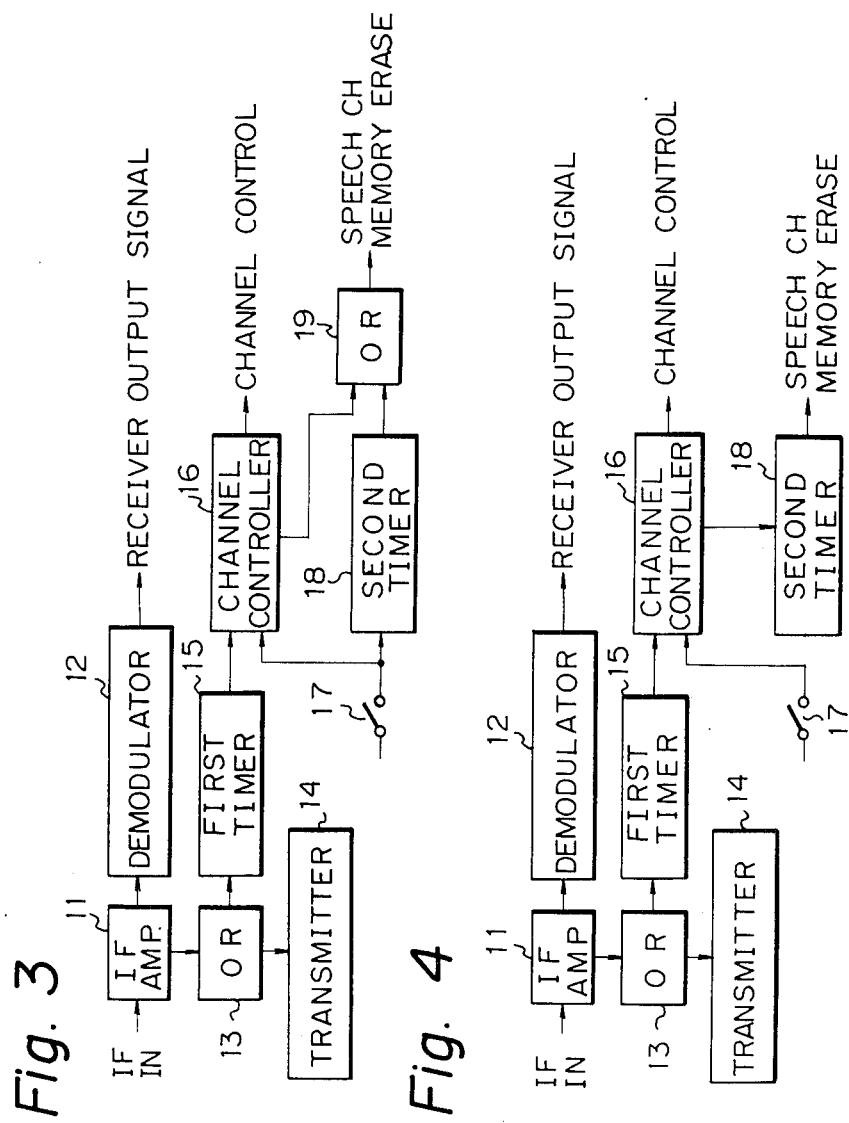

4,618,998

RADIO COMMUNICATIONS CONTROL SYSTEM WHICH AUTOMATICALLY RETURNS THE SYSTEM TO THE SPEECH CHANNEL

BACKGROUND OF THE INVENTION

1. Field of the Invention

The present invention relates to a communications system, and more specifically to a radio communications system of the so-called blind channel system in which display of the radio channel other than a calling channel is eliminated.

2. Description of Background Information

In radio communications systems such as amateur radios of the VHF band or the UHF band, or CB (Citizens Band) of the United States, it is general to use a single call channel and a plurality of speech channels. Also, in Japan, a new radio communications system of this type has been put to practical use to meet the increasing requirement of the personal radio communications system. The blind channel system is one of the radio communications systems of this type, in which the display of channel is eliminated. Further, the blind channel system is equipped with an automatic channel assignment function for automatically shifting the frequency of a station of the other side of communication (referred to as a responding station hereinafter) to a selected speech channel.

In the case of the blind channel system, however, there was a drawback such that it is not possible to return to the selected speech channel on which activity was taking place once a reset switch provided to the system is operated to reset the frequency of the system at the call channel.

In addition, if the reset switch is not operated after the completion of a call, the system will be continuously operating on the selected speech channel and it becomes impossible to communicate with the other stations unless the power switch is turned off.

SUMMARY OF THE INVENTION

An object of the present invention is to provide a radio communications system in which data of the speech channel is memorized for a predetermined time period after the operation of the reset switch which takes place during a call is going on or when a call is completed, thereby making it possible to return to the last used speech channel.

Another object of the invention is therefore to provide a radio communications system in which the frequency of the system is automatically reset at the call channel without need of operating the reset switch when a call on a selected speech channel is completed, so as to prohibit a continuous occupation of the selected speech channel and to make it possible to receive a call from the other station.

According to the present invention, a radio communications system is provided with means for returning to a last used speech channel in the event that a call is required within a predetermined time perod after the system is reset at the call channel during a call on a selected speech channel or when the call is completed.

According to another aspect of the present invention, the communications system is provided with means for automatically resetting the system at the call channel a predetermined time period after a call on a selected speech channel is completed.

BRIEF DESCRIPTION OF THE DRAWINGS

The foregoing and other objects and advantages of the invention will become more clearly understood from the follwing description taken in conjunction with the accompanying drawings which are given by way of illustration only, and thus are not limitative of the present invention, and wherein:

FIG. 3 is a schematical block diagram showing a part of the circuit construction of an embodiment of the radio communications system according to the present invention; and FIG. 4 is a schematical block diagram of another embodiment of the radio communications system according to ther present invention.

DETAILED DESCRIPTION OF PREFERRED EMBODIMENTS

Figures 1, 1A, 2:
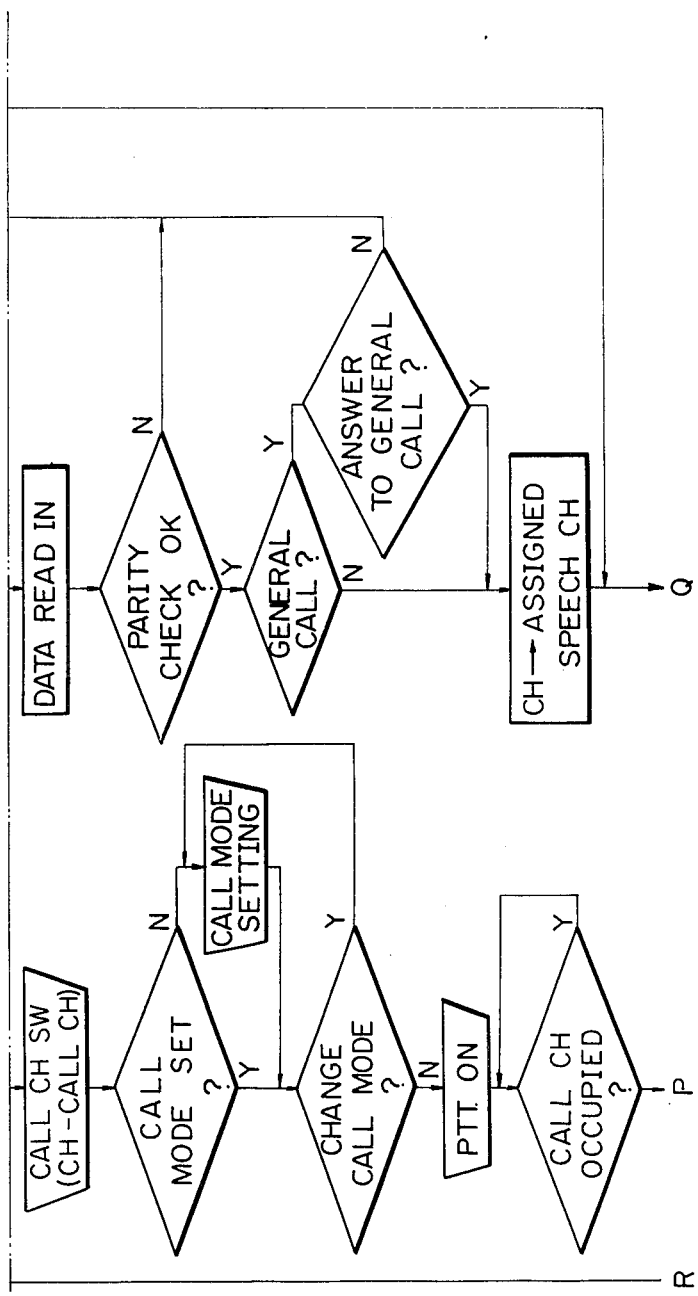
FIGS. 1A and 1B, when combined, are a flow chart of operational sequence of an example of the blind channel type radio communications system.
FIG. 2 is a flow chart showing a part of the operational sequence of the radio communications system according to the present invention.
Figure 1B:
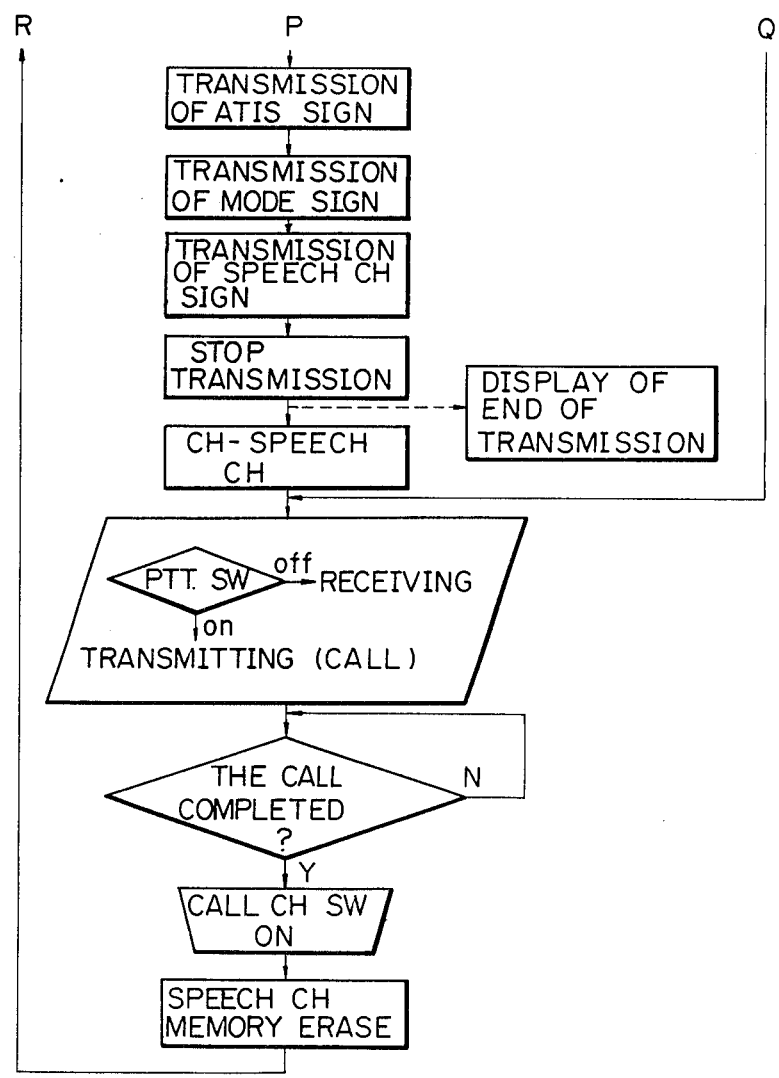
Figure 2:
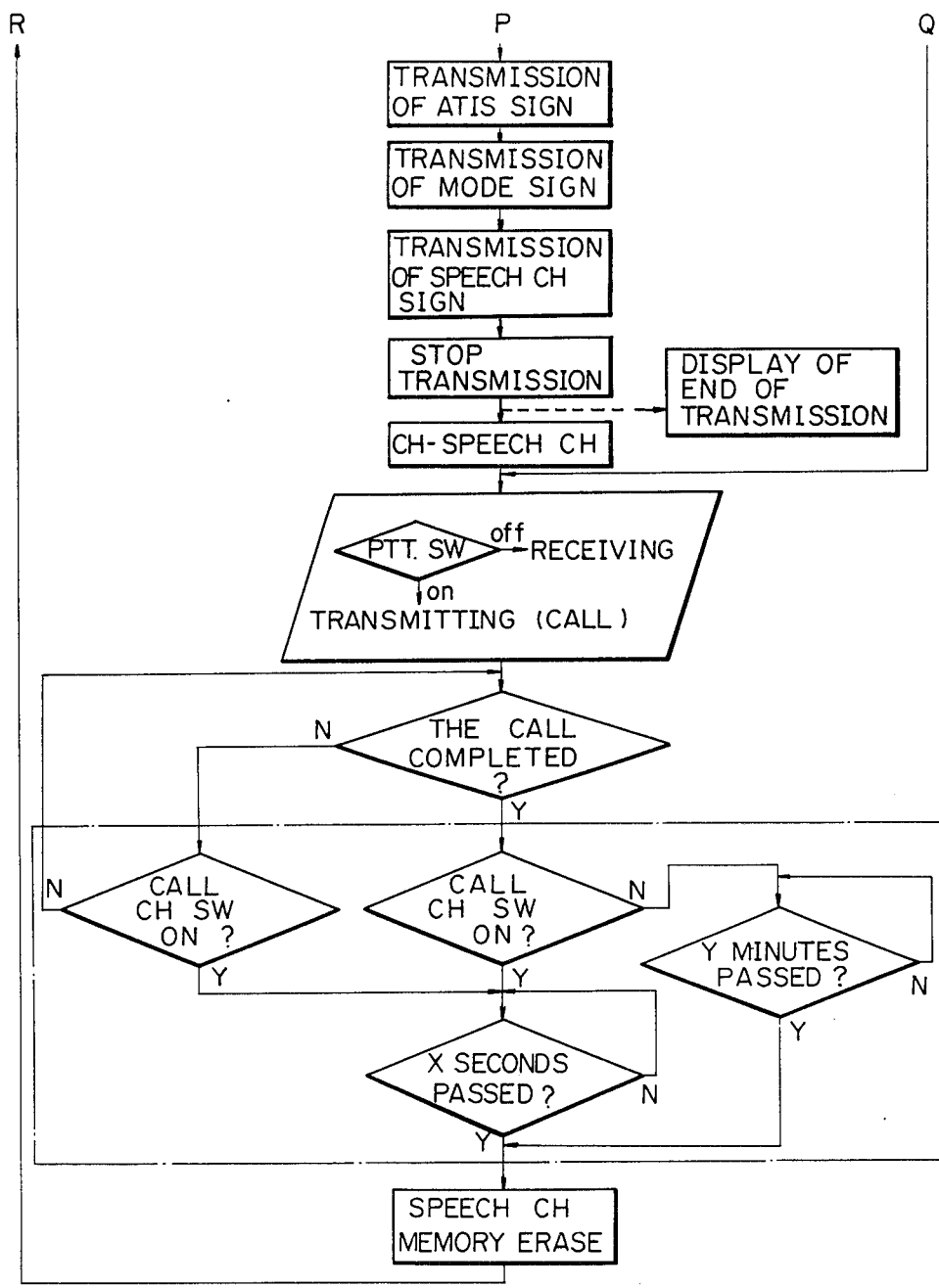

Before entering into the explanation of the embodiment of the present invention, reference is first made to a flow chart of FIGS. 1A and 1B which exemplary shows the manner of operation of the blind channel system.

As shown, an initial setting of the speech channel is performed after the start of the power supply of the system. This operation is to determine a start channel from which a searching of a non-busy speech channel is initiated, and the selection of the channel is performed randomly. Nextly, the frequency of the system is set at a call channel to wait a call from the other station, or in other words, to stand by.

In order to call a responding station, a non-busy channel among the speech channels is searched for by a manual operation. During this searching operation, a content of a speech channel memory means for memorizing the data of speech channel is in turn rewritten in accordance with the searching operation. When the non-busy speech channel is found out, the data indicative of this speech channel is memorized in the speech channel memory means. At this point of time, the system goes back to the call channel once more so that the data of the selected speech channel is transmitted and a mutual communication with the responding station can be started subsequently. This operation of going back to the call channel is executed by the operation of a reset switch which is equipped so as to reset the system at the call channel. In addition, during this operation for calling a responding station, a mode selection is further performed in which the operation of the system is selected between a call toward specified stations of personal group and a general call toward unspecified stations. After that, a data of a call sign, i. e. the call sign of ATIS (Automatic Transmitter Identification System), the call mode data, the speech channel data, and other necessary data of the station are transmitted in accordance with the operation of a transmitting switch, and then the system is automatically set at the selected speech channel whose data was previously stored in the speech channel memory means. With the above sequential operations, the system is held at a communicable state.

On the other hand, on the side of the responding station (or stations) which is standing by on the call channel, if the above transmitted data are received and the station is called by the station of transmitting side, then the frequency of the responding station is automatically switched to the assigned speech channel, and the stations are mutually connected. Further, the system is provided with a switch for refusing the connection from the side of the called station, only when the call is a general call.

When a call or talk on the selected speech channel has been completed, the systems of each station can be respectively reset at the call channel by an operation of the reset switch. At the same time of this operation, the data memorized in the speech channel memory means is automatically erased. Therefore, once the system is reset at the call channel, it is impossible to know which of the speech channel was used lastly, and accordingly further searching of non-busy speech channel is required in order to do another call.

As mentioned before, this erasure of the contents of the memory means causes a serious problem of the operation of the system. First, if the reset switch is accidentally operated during the mutual connection, it is not possible to go back to the selected speech channel. Secondly, if the reset switch is not operated after the completion of the call, the system will be continuously operating at the speech channel used lastly and the discremination of a call from the other stations becomes completely impossible unless the power switch of the system is turned off one time.

In addition, the term "break" used in FIGS. 1A and 1B indicates the operation of interruption which enables to enter into a talk on a speech channel if the operator wishes to join a conversation when the system is monitoring the speech channel.

Referring to FIGS. 2 through 4, the communications system according to the present invention will be explained hereinafter. Reference is first made to FIG. 2 in which the flow chart of a part of the operation of the communications system of the present invention is illustrated and in which a portion enclosed by the partly dotted line indicates the new features of the operational sequence according to the present invention. Further, in FIG. 2, only a portion of the operational sequence corresponding to FIG. 1B is illustrated, and the lines (P), (Q), (R) are to be connected respectively to the lines (P), (Q), (R) of FIG. 1A.

In FIG. 2, the communications system operates in the following manner. In the event that the call channel reset switch remains unoperated after the completion of a conversation, the content of the speech channel memory means will not be erased and the data of the last used speech channel is maintained for a time period of Y minutes. Therefore, the system can be reset at the last used speech channel during this time period of Y minutes.

After the elapse of Y minutes, the contents of the speech channel memory means is erased and the system is automatically reset at the call channel. Thus, an exclusive use of the speech channel is eliminated and the system will be able to stand by for the call from the other stations.

In addition, when the system is reset at the call channel after the completion of a call by means of the call channel reset switch, the speech channel memory means keeps the memorized content during the time period of X seconds after the operation of the call channel reset switch.

Therefore, the system is allowed to return again to the speech channel at any time during this time period of X seconds. Therefore, the system is easily reset at the last used speech channel even if the call channel reset switch is operated by mistake during a call is going on.

FIG. 3 shows a schematic block diagram of an embodiment of the communitations system according to the present invention. As shown, an IF (Intermediate Frequency) signal generated from a receiving RF signal is amplified by an IF amplifier 11 and applied to a demodulator 12. A demodulation signal obtained at this demodulator 12 will be used as a receiver output signal.

An IF signal of the IF amplifer is converted to a signal indicative of the strength of the electric field and then applied to an OR circuit 13. The OR circuit 13 also receive a transmitting signal from a transmitter 14, and an output signal of the OR circuit 13 controls the on/off operation of a first timer 15 which performes the setting of previously described time period of Y minutes.

More specifically, an output signal of the first timer 15 is applied to a channel controller 16 and an output signal of a call channel reset switch 17, which will be referred to as a reset switch hereinafter, is also applied to the channel controller 16 and to a second timer 18 which performs the setting of previously described time period of X seconds. An output signal of the channel controller 16 and an output signal of the second timer are applied to a two input OR circuit 19, an output signal of which performs the erasure of the content of a speech channel memory means (not shown).

By the above described arrangement of the system, when the reset switch 17 is operated regardless of the continuing state or the completion of a call, a command signal is transmitted from the channel controller 16 and the system is automatically reset at the call channel. On the other hand, the erasure of the speech channel data is performed when the erase command signal is produeced at the OR circuit 19 after the elapse of the time period of X seconds (preferably between 2 and 180 seconds) in accordance with the operation of the second timer 18. Since the speech channel data is maintained during this time period of X seconds, the system can be reset at the last used speech channel at any time within this time period. Thus, an unintentional operation of the system due to the operation of the reset switch 17 by mistake, is prevented. Further, it is needless to say that resetting at the last used speech channel can be readily performed by a means such as a reset switch which is not shown in FIG. 3.

The operation of this system will be further explained. Since a transmission signal and a receiving signal are not sensed after the completion of a call, the OR circuit 13 detects this condition and actuates the first timer 15. By the operation of the first timer 15, the channel controller 16 receives a switch command signal after the elapse of the time period of Y minutes (preferably between 1 minute and 30 minutes). Then the system is reset at the call channel and a memory erase command signal is outputted through the OR circuit 19. Therefore, if desired, one more call on the last used speech channel is made possible during this time period of Y minutes. Further, if a transmission signal or a receiving signal is sensed before the end of the count of the time period of Y minutes at the first timer 15, then the first timer 15 is set again at an initial state.

FIG. 4 is a schematic block diagram of another embodiment of the communications system of the present invention, and in which like reference numerals denote like circuit elements.

As shown, this embodiment features that the second timer 18 is controlled by the output signal of the channel controller 16 instead of the output signal of the reset switch 17. As the result of this change, the OR circuit 19 used in the previous embdiment is eliminated and the memory erase command signal is outputted directly from the second timer 18.

In the case of this arrangement, the channel control signal is produced by the channel controller 16 Y minutes after the end of a call which starts the operation of the first timer. Thus, the system is automatically reset at the call channel in accordance with the production of the channel control signal and the second timer 18 is turned on at the same time. Therefore, the erasure of the contents of the speech channel memory is performed Y minutes and X seconds after the end of the call. In other words, the speech channel data stored in the memory means 18 is maintained for the period of X seconds after the reset at the call channel. Since the other portions of the operation of the system is the same as the previous embodiment shown in FIG. 3, the explanation thereof are omitted.

It will be appreciated from the foregoing, that according to the present invention, by the provision of the timer, it becomes possible to go back to the last used speech channel even if the system is reset at the call channel by a mistake when a call on a selected speech channel is going on. Furthermore, the system is automatically reset at the call channel when a predetermined time period has passed after the end of the call. Therefore, the system is able to stand by for another call from the other stations.

It should be understood that the foregoing description is for illustrative purpose only, and is not intended to limit the scope of the invention. Rather, there are numerous equivalents to the preferred embodiments, and such are intended to be covered by the appended claims.

What is claimed is:

1. A radio communications system including a plurality of stations using a call channel and a plurality of speech channels one of which is to be selected to convey information, each of said stations comprising:

a receiving part for receiving a radio signal transmitted by another station;

a transmitting part for transmitting a radio signal modulated in accordance with various information; and a control circuitry for controlling said receiving and transmitting parts which includes, a channel control means connected to said receiving part and said transmitting part for determining a receiving frequency of said receiving part and a frequency of a transmitting radio signal from said transmitting part, among frequencies of said call channel and said plurality of speech channels;

a speech channel memory means connected to said channel control means for temporarily memorizing a frequency data of a speech channel on which an activity is taking place;

a manually operable reset switch for transmitting a reset command signal to said channel control means for resetting the frequency of the system at said call channel;

a first timer means connected to said receiving part, said transmitting part, and said channel control means, for detecting a condition that none of said radio signals is present in said receiving and transmitting parts and transmitting a first timer output signal to said channel control means with a delay of a first predetermined time period after the detection of said condition, thereby controlling said channel control means to reset the frequency of the system at said call channel after the delay of said first predetermined time period; and a second timer means connected to said manually operable reset switch and said channel control means and to said speech channel memory means, and responsive to said reset command signal and transmitting an erase command signal to said speech channel memory means with a delay of a second predetermined time period after a reception of said reset command signal, thereby delaying an erasure of said frequency data memorized in said speech channel memory means so that a last used speech channel can be recalled by said channel control means from said speech channel memory means.

2. A control circuitry for a station of a radio communications system operative among a plurality of stations each having a transmitting part and a receiving part which use to call channel and a plurality of speech channels one of which is to be selected to convey information, and having said control circuitry, said control circuitry comprising:

a channel control means connected to said receiving part and said transmitting part for determining a receiving frequency of said receiving part and a frequency of a transmitting radio signal from said transmitting part, among frequencies of said call channel and said plurality of speech channels;

a speech channel memory means connected to said channel control means for temporarily memorizing a frequency data of a speech channel on which an activity takes place;

a manually operable reset switch for transmitting a reset command signal to said channel control means for resetting the frequency of the system at said call channel;

a first timer means connected to said receiving part, said transmitting part, and said channel control means, for detecting a condition that no radio signal is present in said receiving and transmitting parts and transmitting a first timer output signal to said channel control means with a delay of a first predetermined time period after the detection of said condition, thereby controlling said channel control means to reset the frequency of the system at said call channel after the delay of said first predetermined time period; and a second timer means connected to said manually operable reset switch and said channel control means and to said speech channel memory means, and responsive to said reset command signal and transmitting an erase command signal to said speech channel memory means with a delay of a second second predetermined time period after a reception of said reset command signal, thereby delaying an erasure of said frequency data memorized in said speech channel memory means so that a last used speech channel can be recalled by said channel control means from said speech channel memory means.

* * * * *